(12) United States Patent
Harman et al.

(10) Patent No.: US 9,476,294 B2
(45) Date of Patent: Oct. 25, 2016

(54) DEVICE AND METHOD FOR DISCRETE DISTRIBUTED OPTICAL FIBER PRESSURE SENSING

(75) Inventors: Robert M. Harman, Troutville, VA (US); Philippe Legrand, The Woodlands, TX (US); Brooks Childers, Christianburg, VA (US); Roger Duncan, Christianburg, VA (US); Alan Reynolds, Windsor, VA (US); Sam Dippold, Christianburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 679 days.

(21) Appl. No.: 12/956,777

(22) Filed: Nov. 30, 2010

(65) Prior Publication Data

US 2011/0191031 A1    Aug. 4, 2011

Related U.S. Application Data

(60) Provisional application No. 61/299,712, filed on Jan. 29, 2010.

(51) Int. Cl.
*G01L 1/24* (2006.01)
*E21B 47/06* (2012.01)
*E21B 47/12* (2012.01)
(Continued)

(52) U.S. Cl.
CPC ............. *E21B 47/06* (2013.01); *E21B 47/123* (2013.01); *G01L 1/243* (2013.01); *G01L 11/025* (2013.01); *G01L 19/0092* (2013.01)

(58) Field of Classification Search
CPC ......................................... G01L 5/04

USPC ....... 702/66, 73, 76, 94, 101, 117, 150, 179, 702/183, 190, 193, 194, 189, 197; 330/51, 330/149
See application file for complete search history.

(56) References Cited

U.S. PATENT DOCUMENTS 5,096,277 A * 3/1992 Kleinerman ......... G01D 5/3538
                                                      374/131
5,386,729 A    2/1995 Reed et al.
(Continued)

FOREIGN PATENT DOCUMENTS

JP     61066134 A     4/1986
JP     06341814      12/1994
JP     2002054974    2/2002

OTHER PUBLICATIONS

Notification of Transmittal of the International Search Report and the Written Opinion of the International Searching Authority, or the Declaration; PCT/US2011/022599; Aug. 29, 2011.
(Continued)

*Primary Examiner* — Gregory J Toatley
*Assistant Examiner* — Felix Suarez
(74) *Attorney, Agent, or Firm* — Cantor Colburn LLP

(57) ABSTRACT

An apparatus for estimating at least one parameter includes: a deformable member configured to deform in response to the at least one parameter; a housing surrounding at least a portion of an external surface of the deformable member to define an isolated region around the portion and an isolated surface of the deformable member; and at least one optical fiber sensor disposed on the isolated surface and held in an operable relationship with the isolated surface, the at least one optical fiber sensor configured to generate a signal in response to a deformation of the deformable member.

20 Claims, 5 Drawing Sheets

(51) Int. Cl.
*G01L 11/02* (2006.01)
*G01L 19/00* (2006.01)

(56) References Cited

U.S. PATENT DOCUMENTS

| | | | |
|---|---|---|---|
| 5,589,937 A * | 12/1996 | Brininstool | 356/480 |
| 5,936,235 A | 8/1999 | Minamitani et al. | |
| 6,301,957 B1 | 10/2001 | Sakaguchi et al. | |
| 6,563,970 B1 | 5/2003 | Bohnert et al. | |
| 6,740,866 B1 | 5/2004 | Bohnert et al. | |
| 6,898,339 B2 | 5/2005 | Shah et al. | |
| 6,959,135 B1 * | 10/2005 | Bickham et al. | 385/123 |
| 7,134,346 B2 | 11/2006 | Lopushansky et al. | |
| 7,197,934 B2 | 4/2007 | Wittrisch et al. | |
| 7,262,834 B2 * | 8/2007 | Kageyama et al. | 356/28 |
| 7,266,261 B2 | 9/2007 | Arias Vidal et al. | |
| 7,295,493 B1 * | 11/2007 | Ames | 367/149 |
| 7,458,273 B2 | 12/2008 | Skinner et al. | |
| 7,458,420 B2 | 12/2008 | Rioufol et al. | |
| 7,946,341 B2 * | 5/2011 | Hartog et al. | 166/254.1 |
| 8,380,021 B2 * | 2/2013 | Kreisler Rambow | 385/13 |
| 2004/0231429 A1 | 11/2004 | Niezgorski et al. | |
| 2005/0263281 A1 | 12/2005 | Lovell et al. | |
| 2006/0062510 A1 | 3/2006 | Arias Vidal et al. | |
| 2006/0071158 A1 | 4/2006 | Van Der Spek | |
| 2007/0126594 A1 * | 6/2007 | Atkinson et al. | 340/853.1 |
| 2011/0288843 A1 * | 11/2011 | Weng | E21B 47/1005 703/10 |

OTHER PUBLICATIONS

Shiach, et al. "Advanced Feed-through Systems for In-Well Optical Fibre Sensing". Sensors and their Applications XIV (SENSORS07)., Journal of Physics: Conference Series 76(2007) 012066. pp. 1-6.

* cited by examiner

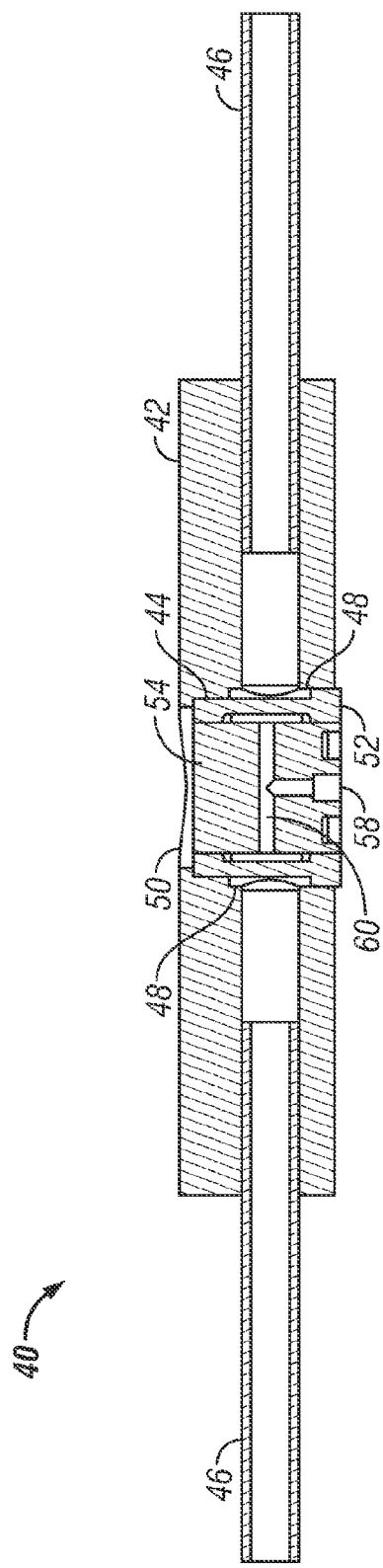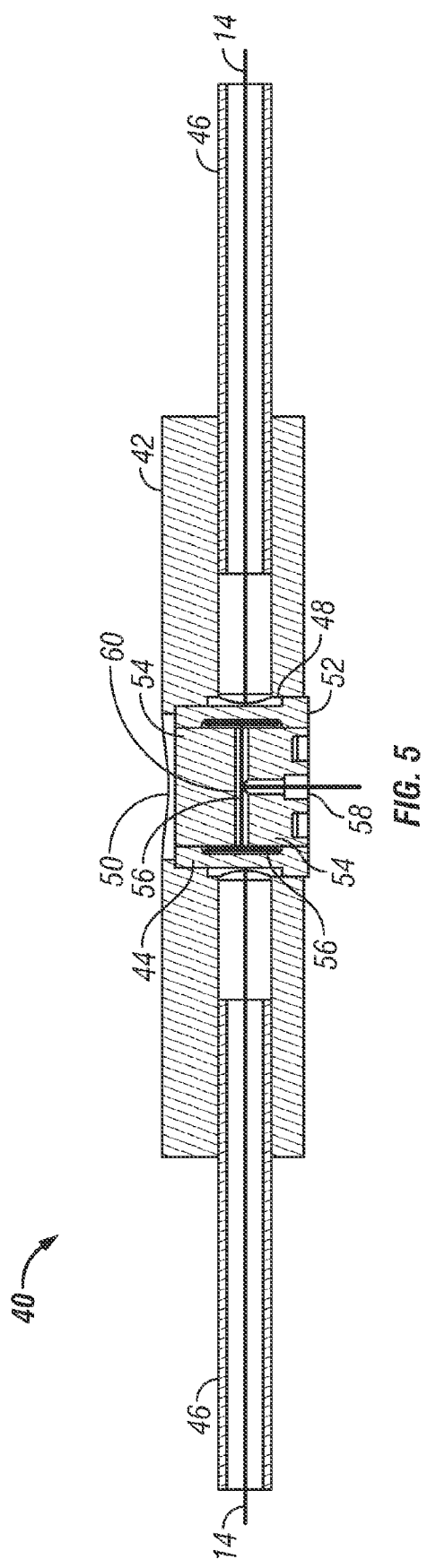

DEVICE AND METHOD FOR DISCRETE DISTRIBUTED OPTICAL FIBER PRESSURE SENSING

BACKGROUND

Optical fiber sensors may be used to monitor many different parameters on structures or in selected environments. Examples of optical fiber sensors include Fiber Bragg Grating (FBG) sensors that may be utilized to detect strain in an optical fiber. Operationally, a knowledge of pressure and temperature within a reservoir is important to ensure efficient well and reservoir management. Furthermore, in subterranean operations such as drilling and borehole completion, an accurate measure of the forces and pressures in the downhole environment is important to facilitate downhole operations as well as protect the integrity of downhole components. Due to the extreme conditions in downhole environments, designing devices for measuring forces, pressures, temperatures, and other conditions, that can be readily integrated with downhole components, is technically challenging.

SUMMARY OF THE INVENTION

An apparatus for estimating at least one parameter includes: a deformable member configured to deform in response to the at least one parameter; a housing surrounding at least a portion of an external surface of the deformable member to define an isolated region around the portion and an isolated surface of the deformable member; and at least one optical fiber sensor disposed on the isolated surface and held in an operable relationship with the isolated surface, the at least one optical fiber sensor configured to generate a signal in response to a deformation of the deformable member.

A distributed sensor apparatus for estimating at least one parameter includes: a plurality of apparatuses for estimating the at least one parameter, each of the plurality of apparatuses in a distributed relationship with one another, each of the plurality of apparatuses comprising: a deformable member configured to deform in response to the at least one parameter; a housing surrounding at least a portion of an external surface of the deformable member to define an isolated region around the portion and an isolated surface of the deformable member; and at least one optical fiber sensor disposed on the isolated surface and held in an operable relationship with the isolated surface, the at least one optical fiber sensor configured to generate a signal in response to a deformation of the deformable member.

A method of estimating at least one parameter includes: exposing a deformable member to the at least one parameter, at least a portion of the deformable member being surrounded by a housing to define an isolated region around the portion and an isolated surface of the deformable member; deforming the deformable member; transmitting a measurement signal into at least one optical fiber sensor, the at least one optical fiber sensor disposed on the isolated surface and held in an operable relationship with the isolated surface; receiving a return signal through the optical fiber sensor, the return signal dependent on a deformation of the optical fiber sensor in response to the deforming; and estimating the at least one parameter based on the return signal.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a cross-sectional view of an embodiment of a force and/or pressure measurement apparatus;

FIG. 5 is another cross-sectional view of the force and/or pressure measurement apparatus of FIG. 4;

DETAILED DESCRIPTION

A Pressure sensing apparatus, such as a pressure transducer, and a method for sensing parameters such as temperature, strain, pressure and other forces are described herein. In one embodiment, the pressure sensing apparatus is configured as a pressure transducer. The apparatus includes a deformable member such as a tube that is deformable in response to pressure and/or other forces. Such forces include, for example, axial forces and internal pressures exerted on the deformable member. A housing isolates at least a portion of the external surface of the deformable member from the forces. At least one optical fiber sensor, for example an optical fiber including one or more measurement units such as Bragg gratings or Rayleigh scattering fiber regions, is disposed on the elongated member at one or more locations on the isolated surface portion. In one embodiment, the apparatus is a temperature compensated transducer, which may be incorporated into various tools and components or configured as an independent component. The apparatus, in one embodiment, is configured to include external pressure or force isolation to facilitate force and/or pressure estimation. In one embodiment, the apparatus is included in one or more downhole components such as a downhole tool or a drill string, production string or other device configured to be deployed downhole.

Figure 1:
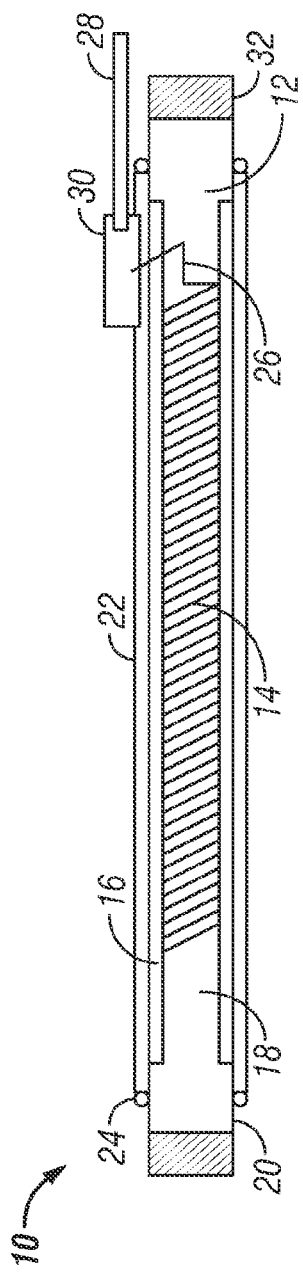
FIG. 1 is a cross-sectional view of an exemplary non-limiting embodiment of a force and/or pressure transducer.

Referring to FIG. 1, a strain, force and/or pressure transducer 10 includes an elongated member such as a tube 12 and an optical fiber sensor 14 that is disposed on at least a portion of the tube 12. The optical fiber sensor 12, in one embodiment, includes an optical fiber having one or more measurement units such as fiber Bragg gratings (FBG) located along the length of the optical fiber sensor 12. Other measurement units may include lengths or regions of the optical fiber sensor 12 utilized for the detection of Rayleigh backscattering signals. The elongated member 12 may be any member deformable by a force and/or pressure, and need not take the specific shapes and configurations described herein. The transducer 10 is configured to estimate various parameters such as temperature, strain, pressure and other forces exerted at various locations on the transducer 10. Examples of such parameters include external and internal parameters such as strain, pressure and other forces on the transducer 10 or a device associated with the transducer 10. For example, the transducer is configured to estimate parameters such as external and internal parameters on the same device and/or external and internal parameters co-located on or in the same device.

The tube 12 is configured to include a pressure and/or force isolated region 16 such as an air gap 16, which is isolated from the forces on the tube 12 that the transducer 10 is configured to estimate. In one embodiment, the tube 12 includes a reduced diameter portion 18, so that the tube 12 includes the reduced diameter portion 18 and a large diameter portion 20. The annular area around the reduced diameter portion 18 extending radially can be isolated from the measured forces. The optical fiber sensor 14 is disposed on at least a portion of the exterior surface of the reduced diameter portion, i.e., the isolated surface portion. In one embodiment, the optical fiber sensor 14 is wrapped around and affixed to the reduced diameter portion 18. The shape and configuration of the portion 18 is not limited to those described herein. The portion 18 may take any shapes, configuration or size configured to isolate a region from forces and/or pressures exerted on the elongated member 12.

In one embodiment, a housing or other structure 22 such as a tubular sleeve 22 is disposed about at least a portion of the tube 12 to form the air gap 16. The housing 22 acts to isolate the air gap 16 from external forces such as fluid pressure or forces from other components or materials. The reduced diameter portion 18 and the housing 22 both act as pressure boundaries. In this way, the air gap or other isolated region 16 is at least substantially unaffected by pressures or other forces on the tube 12, and is also substantially unaffected by pressures or other forces around the exterior of the sleeve or other housing 22. The housing 22 can be connected or attached to the tube 12 by any suitable mechanism, such as a friction fit (e.g., welds) or mechanical sealing methods 24, and can take any shape or configuration suitable for further defining the isolated region 16.

In one embodiment, the transducer 10 includes a force, pressure and/or strain insensitive temperature sensor 26 configured to measure the temperature of the tube 12 and/or the reduced diameter portion 18. This allows for a user or processor to take into account temperature effects on the reduced diameter portion 18 and/or the optical fiber sensor 14 in estimating pressure or other forces on the tube 12. In one example, the temperature sensor 26 includes a portion of the optical fiber sensor 12 that is not affected by deformation. For example, the temperature sensor portion is positioned parallel to the major axis of the tube 12 so that expansion or contraction of the tube 12 (due to, e.g., internal pressure) does not affect the temperature sensor portion 26.

The optical fiber sensor 14 is positioned on the tube 12 so that one or more portions of the optical fiber sensor 14 are disposed on an exterior surface of the tube 12 that is surrounded by the isolated region 16, such as on the reduced diameter portion 18. In one embodiment, the optical fiber sensor 14 is wrapped around the reduced diameter portion 18 in a spiral or helical manner, forming one or more turns around the reduced diameter portion 18. In one example, the sensor 14 is wrapped so that the turns are generally perpendicular to the major axis. Deformation of the tube 12, particularly the reduced diameter portion 18, such as expansion or contraction, causes effects such as micro-bends in the optical fiber sensor 14, which in turn cause a change (e.g., a wavelength shift) in the signal returned by the measurement units. This signal change can be used to determine the deformation and estimate force and/or pressure based on the deformation. The optical fiber sensor 14 and/or the temperature sensor 26 are in communication with a user, control unit or other processor or storage device via suitable communication mechanisms such as a cable 28. The optical fiber sensor 14 can be connected to the cable 28, for example, via a splice box 30.

In the example shown in FIG. 1, the transducer 10 may be configured to be deployed in a borehole for use in subterranean exploration, formation evaluation, drilling and/or hydrocarbon production operations. The tube 12 in this example includes connection mechanisms such as threads 32 to allow the transducer 10 to be coupled to other devices or downhole components. In one example, the transducer 10 is configured as part of a downhole string, such as a production string or drill string. In another example, the tube 12 is a section of a downhole string such as a pipe section.

Figure 2:
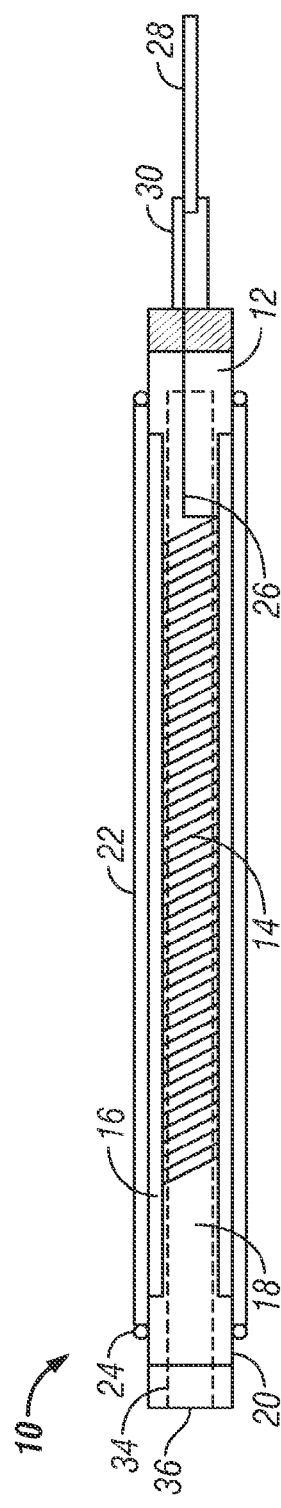
FIG. 2 is a cross-sectional view of an alternative embodiment of the force and/or pressure transducer of FIG. 1.

FIG. 2 illustrates another embodiment of the transducer 10, in which the tube 12 includes a hollow interior 34 coupled to an intake port 36 to allow the transducer 10 to estimate media pressure. As described herein, "media" refers to any substance capable of moving into at least a portion of the hollow interior 34 or otherwise transferring pressure into the interior 34. Examples of such media include liquids, gases, flowable solids (e.g., sand) and any combination thereof. In use, media is forced into the interior 34 through the intake port 36, and the radial expansion of the reduced diameter portion 18 is measured via the optical fiber sensor 14. This information is then transmitted to a user or processor to estimate the fluid pressure. This embodiment also illustrates alternative configurations for the cable 28 and the splice box 30.

Figure 3:
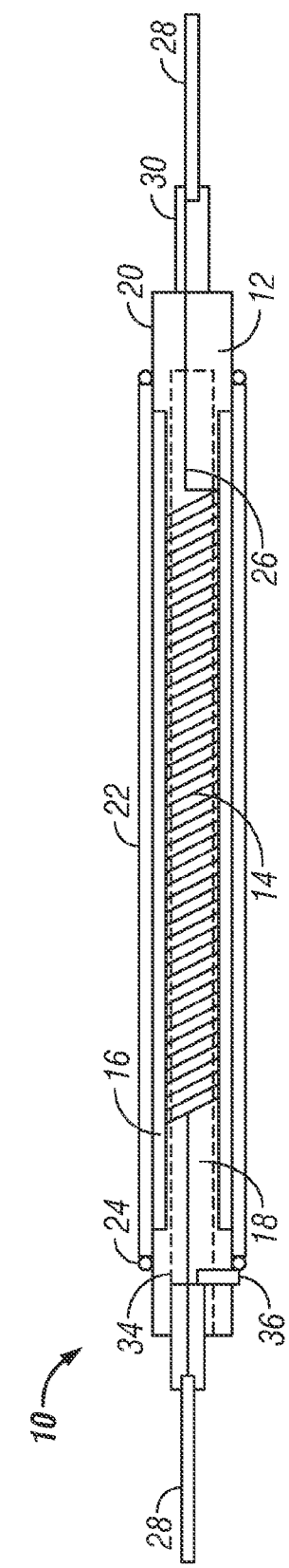
FIG. 3 is a cross-sectional view of another alternative embodiment of the force and/or pressure transducer of FIG. 1.

FIG. 3 illustrates another variation in the transducer 10, in which the transducer 10 is coupled in connection and/or operable communication with other components at both ends of the tube 12. This embodiment shows the ability of the transducer 10 to be coupled as part of a string of components or other transducers 10. For example, a string of transducers can be coupled together to form a distributed force and/or pressure sensing apparatus. In another example, the string of transducers 10 are connected via a single optical fiber or optical fiber bundle. In this embodiment, the optical fiber sensor 14 and/or the temperature sensor 26 include a single continuous optical fiber that extends between each end of the transducer 10.

Referring to FIGS. 4 and 5, an embodiment of a pressure sensing apparatus 40 includes a housing 42 supporting an elongated member such as a cylinder 44. In one embodiment, the housing includes conduits 46 to allow for the passage of at least one optical fiber sensor 14 therethrough. An isolated portion 48 such as an air gap is formed around a portion of an exterior surface of the elongated member 44. In one embodiment, the elongated member 44 is disposed in an opening 50 in the housing 42, and the isolated portion 48 is formed in the opening 50 between the elongated member 44 and the housing 42.

In one embodiment, the elongated member 44 is positioned so that its major axis is orthogonal relative to the major axis of the conduits 46. The optical fiber sensor 14 is, in one embodiment, wrapped around the elongated member 44 so that at least one turn is orthogonal to the elongated member's major axis. The optical fiber sensor 14, in one embodiment, is at least one continuous optical fiber extending between the ends of the apparatus 40.

An example of the elongated member 44 is shown in FIGS. 4 and 5. In this example, the elongated member 44 includes a hollow tube 52, such as a hollow cylinder, having an interior cavity into which media 56 can enter. An optional inner member 54 is disposed within the hollow tube 52 and directs the flow of media 56. The media can be inputted directly into an annular space between the inner member 54 and the hollow tube 52, or may be inputted via a port 58 in communication with passageways 60 through which the media 56 can be directed.

Figure 6:
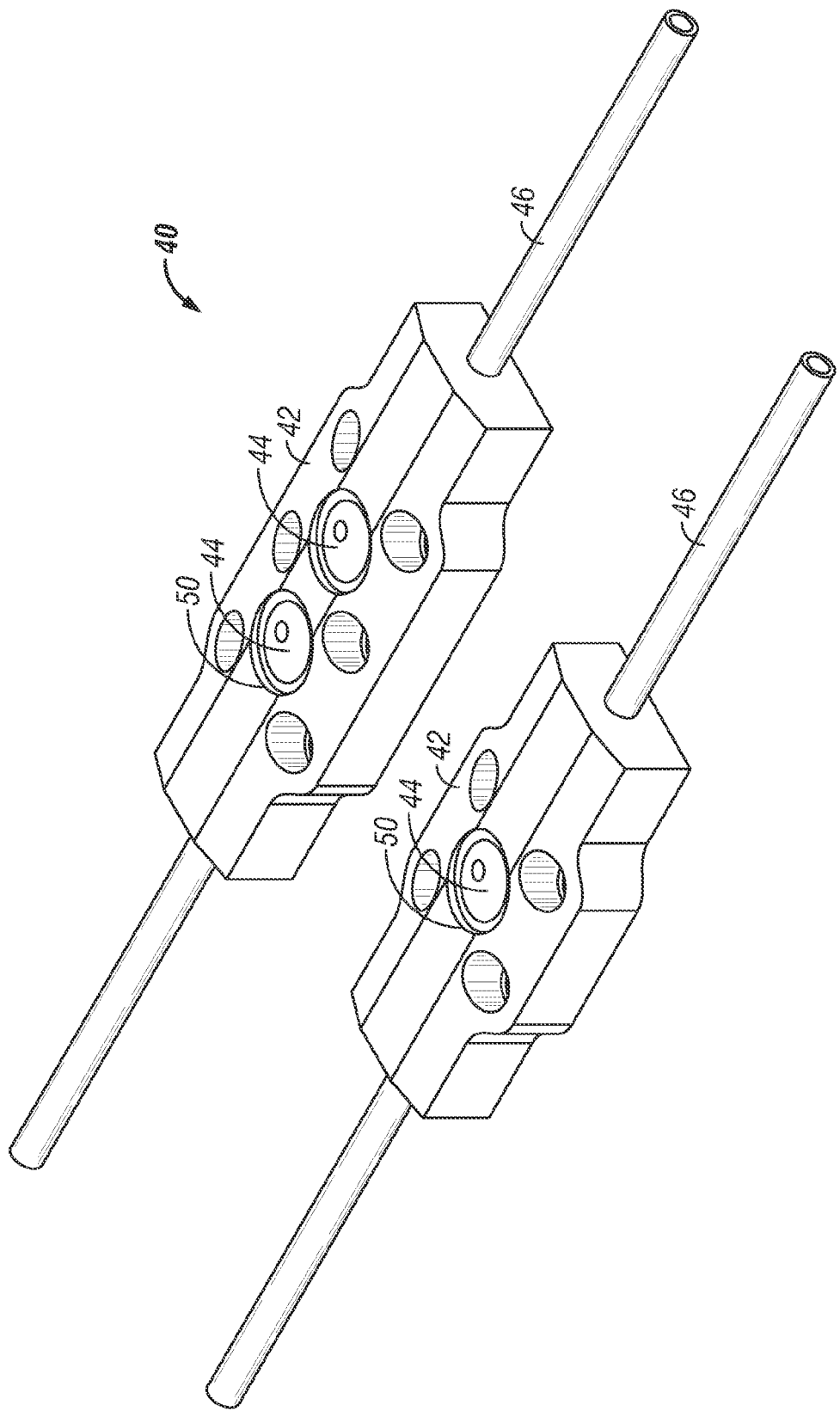
FIG. 6 is a perspective view of an embodiment of a distributed force and/or pressure measurement apparatus.

In one embodiment, multiple transducers 10 and/or apparatuses 40 can be operably connected to form a discrete distributed pressure sensing system or apparatus. For example, as shown in FIG. 6, the apparatus 40 is a discrete distributed apparatus including multiple elongated members 44. One or more optical fiber sensors are disposed on each elongated members to provide a pressure sensor at multiple locations. In one embodiment, the multiple optical fiber sensors are included in a continuous optical fiber that is disposed on and extends between each elongated member 44.

Figure 7:
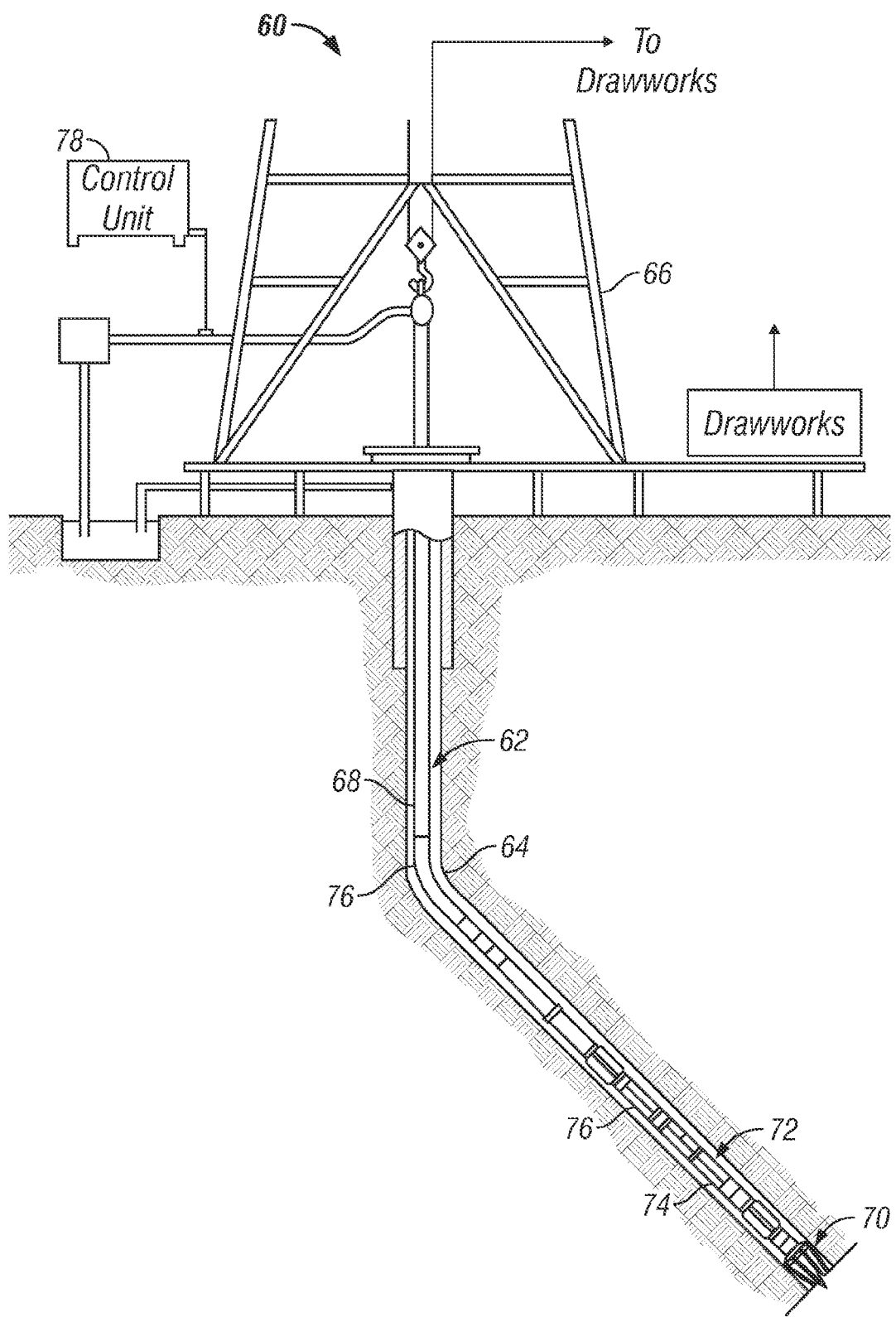
FIG. 7 is a cross-sectional view of a subterranean well drilling, evaluation, exploration and/or production system.

Referring to FIG. 7, an exemplary embodiment of a subterranean well drilling, evaluation, exploration and/or production system 60 includes a borehole string 62 that is shown disposed in a borehole 64 that penetrates at least one earth formation during a subterranean operation. The borehole string 52 includes any of various components to facilitate subterranean operations. As described herein, "borehole" or "wellbore" refers to a single hole that makes up all or part of a drilled well. As described herein, "formations" refer to the various features and materials that may be encountered in a subsurface environment and surround the borehole.

In one embodiment, the system 60 includes a conventional derrick 66 for supporting and/or deploying the borehole string 62 and the various components. The borehole string 62 includes one or more pipe sections 68 or coiled tubing that extend downward into the borehole 64. In one example, the system 60 is a drilling system and includes a drill bit assembly 70. The system 60 may also include a bottomhole assembly (BHA) 72. The system 60 and/or the borehole string 62 include any number of downhole tools 74 for various processes including drilling, hydrocarbon production, and formation evaluation (FE) for measuring one or more physical quantities in or around a borehole.

In one embodiment, the system 60, the tools 74, pipe sections 68, the borehole string 62 and/or the BHA 72 include at least one pressure and/or force sensor 76, such as the transducer 10 and/or the apparatus 40. The pressure and/or force sensors 76 are configured to measure various forces on system components, in the borehole 62 and/or in the surrounding formation. Exemplary forces include pressure from drilling, production and/or borehole fluids, pressure from formation materials, and axial force on components of the borehole string 62, tools 72 or other downhole components of the system 60.

In one embodiment, the tools 72 and/or pressure sensors 76 are equipped with transmission equipment to communicate ultimately to a surface processing unit 78. Such transmission equipment may take any desired form, and different transmission media and connections may be used. In one example, the optical fiber sensor 14 is coupled to other optical fibers to transmit signals related to pressure and/or force to the surface processing unit 78.

In one embodiment, the surface processing unit 78, the pressure sensors 76, and/or other components of the system 60 include devices as necessary to provide for storing and/or processing data collected from the pressure sensors 76 and other components of the system 60. Exemplary devices include, without limitation, at least one processor, storage, memory, input devices, output devices and the like.

Figure 8:
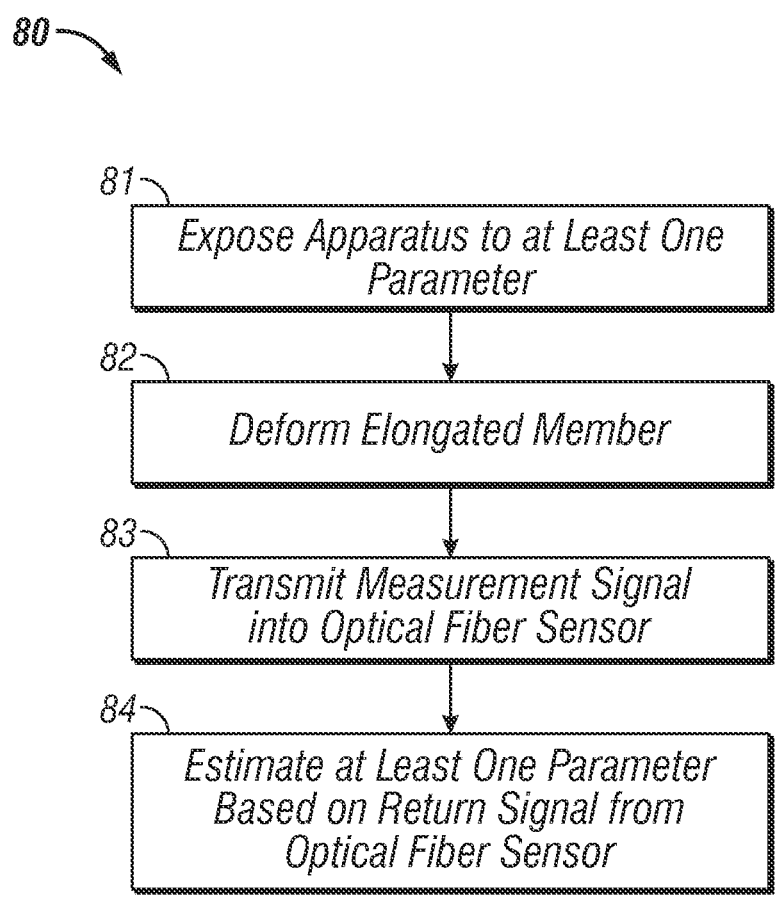
FIG. 8 is a flow chart illustrating an exemplary method of estimating a force and/or pressure.

FIG. 8 illustrates a method 80 of estimating a force and/or pressure. The method 80 includes one or more stages 81-84. Although the method 80 is described in conjunction with pressure and/or force sensing apparatuses such as the transducer 10 or the apparatus 40, the method 80 is not limited to use with these embodiments. In one embodiment, the method 80 includes the execution of all of stages 81-84 in the order described. However, certain stages may be omitted, stages may be added, or the order of the stages changed.

In the first stage 81, a pressure sensing apparatus such as the transducer 10 or the apparatus 40 is exposed to a force and/or pressure. For example, the pressure sensing apparatus is a pipe section or other component deployed in a downhole environment.

In the second stage 82, a parameter such as force and/or pressure is applied to the elongated member of the apparatus to deform the elongated member. Examples of such forces include axial forces on the elongated member and media pressure on an interior of the elongated member. For example, in the case of a downhole sensing apparatus, a force may include an axial force (i.e., a force generally parallel to the major axis of the elongated member) exerted by a borehole string and/or a pressure exerted by borehole fluids inputted into the elongated member. The elongated member deforms in response to the force and/or pressure, such as by radially expanding or contracting, resulting in an increase or decrease in diameter.

In the third stage 83, a measurement signal such as light having one or more selected wavelengths is generated and transmitted into the optical fiber sensor. The optical fiber sensor and/or measurement units reflect a portion of the measurement signal as a return signal. Deformation of the optical fiber sensor, such as microbending, due to deformation of the elongated member, causes the return signal to change (e.g., shift wavelength). The return signal is received by an appropriate user or processor.

In the fourth stage 84, the return signal change is analyzed to estimate at least one parameter on the elongated member. For example, the return signal change is used to determine the strain of the elongated member, which is in turn used to estimate the corresponding force and/or pressure. In one embodiment, the temperature is also determined from signals received from the pressure insensitive temperature sensor in order to properly account for the affect of temperature on the return signals from the optical fiber sensor.

The apparatuses and methods described herein provide various advantages over existing methods and devices. For example, the optical fiber sensor can be wrapped around or otherwise disposed on a pressure and/or force isolated portion of a member, thereby increasing the sensitivity of the apparatus by increasing the sensitivity of the optical fiber sensor to pressure induced deformations of the member, as well as provide the pressure delta required to allow for deformation of the member. In addition, the configurations described above allow for multiple pressure sensing regions to be placed on a single fiber, allowing for the creation of a distributed sensing apparatus having multiple discrete sensors or a continuous string for, e.g., pressure profiling. In addition, the apparatus can be easily incorporated into existing structures (e.g. a modified section of production tubing) or be included as a separate transducer.

In connection with the teachings herein, various analyses and/or analytical components may be used, including digital and/or analog systems. The apparatus may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. An apparatus for estimating at least one parameter, comprising:
   a transducer configured to measure the at least one parameter, the at least one parameter including a parameter of a fluid, the transducer including:
   a deformable elongated member configured to deform in response to the parameter of the fluid, the parameter of the fluid including a force exerted on the elongated member due to the fluid;
   a housing surrounding a portion of a surface of the elongated member to define an isolated region bounded by the portion and the housing, and to define an isolated surface of the elongated member, the housing configured to exclude the fluid from the isolated region and the isolated surface to cause the isolated region and the isolated surface to be isolated from the fluid and from the parameter of the fluid to be estimated;
   an exposed portion of the surface of the elongated member configured to be exposed to the fluid and the parameter of the fluid; and
   at least one optical fiber sensor including an optical fiber disposed on the elongated member, the optical fiber having a first fiber portion and a second fiber portion, the first fiber portion disposed on the isolated surface and held in an operable relationship with the isolated surface, the first fiber portion configured to generate a first signal in response to a deformation of the elongated member due to the parameter of the fluid, the second fiber portion disposed on the elongated member and configured to generate a second signal indicative of a temperature, the second fiber portion oriented relative to a major axis of the elongated member such that the second fiber portion is insensitive to the deformation of the elongated member due to the parameter of the fluid.

2. The apparatus of claim 1, wherein the deformation of the elongated member includes radial expansion or contraction of the deformable member, and the second portion is oriented at least substantially parallel to the axis so that the second portion is insensitive to the radial expansion or contraction.

3. The apparatus of claim 2, wherein the elongated member includes a reduced diameter portion and the housing includes a sleeve surrounding the elongated member, the reduced diameter portion and the sleeve defining the isolated region.

4. The apparatus of claim 2, wherein the elongated member is one of a solid tubular member and a hollow tubular member.

5. The apparatus of claim 4, further comprising a media input port in media communication with the hollow tubular member.

6. The apparatus of claim 2, wherein the first fiber portion is wrapped around the isolated surface and defines at least one turn around the isolated surface, the first fiber portion is configured to generate the first signal in response to radial expansion or contraction of the deformable member, and the second fiber portion is oriented at least substantially parallel to the axis so that the second portion is insensitive to the radial expansion or contraction.

7. The apparatus of claim 6, wherein the at least one turn is at least generally perpendicular to a major axis of the elongated member.

8. The apparatus of claim 6, wherein the second fiber portion is positioned at least substantially parallel to a major axis of the elongated member.

9. The apparatus of claim 1, wherein the deformable member is an elongated member, the deformation is at least one of a radial expansion and a radial contraction of the elongated member, and the second fiber portion is configured to be insensitive to the radial expansion and the radial contraction.

10. The apparatus of claim 1, wherein the first fiber portion and the second fiber portion form a continuous length of the optical fiber.

11. The apparatus of claim 2, wherein the elongated member has a first end and a second end, and the optical fiber sensor is a portion of an optical fiber extending between the first end and the second end.

12. The apparatus of claim 1, wherein the apparatus is configured to be incorporated in at least one of a downhole tool and a borehole string.

13. The apparatus of claim 12, wherein the deformable member is a portion of the borehole string.

14. The apparatus of claim 1, further comprising a processing unit in operable communication with the optical fiber sensor and configured to estimate a pressure based on the deformation of the deformable member.

15. The apparatus of claim 1, wherein the at least one parameter is at least one of temperature, pressure and strain.

16. The apparatus of claim 1, wherein the at least one parameter is at least one of an external force on the apparatus, an internal force on the apparatus, a media pressure exerted on an interior of the hollow member and an axial force exerted on the deformable member.

17. A distributed sensor apparatus for estimating at least one parameter, comprising:
   a plurality of apparatuses for estimating at least one parameter of a fluid, each of the plurality of apparatuses in a distributed relationship with one another, each of the plurality of apparatuses including a transducer configured to measure the at least one parameter, the at least one parameter including a parameter of a fluid, the transducer including:
   an elongated deformable member configured to deform in response to the parameter of the fluid, the parameter of the fluid including a force exerted on the deformable member due to the fluid;
   a housing surrounding a portion of a surface of the deformable member to define an isolated region bounded by the portion and the housing, and to define an isolated surface of the deformable member, the housing configured to exclude the fluid from the isolated region and the isolated surface to cause the isolated region and the isolated surface to be isolated from the fluid and from the parameter of the fluid to be estimated, an exposed portion of the surface of the deformable member configured to be exposed to the fluid and the parameter of the fluid; and at least one optical fiber sensor including an optical fiber disposed on the deformable member, the optical fiber having a first fiber portion and a second fiber portion, the first fiber portion disposed on the isolated surface and held in an operable relationship with the isolated surface, the first fiber portion configured to generate a first signal in response to a deformation of the deformable member due to the parameter of the fluid, the second fiber portion disposed on the deformable member and oriented relative to a major axis of the deformable member such that the second fiber portion is configured to generate a second signal indicative of a temperature, the second fiber portion insensitive to the deformation of the deformable member due to the parameter of the fluid.

18. The distributed sensor apparatus of claim 17, wherein each of the optical fiber sensors are included in a continuous optical fiber.

19. A method of estimating at least one parameter, comprising:

exposing an elongated deformable member to a parameter of a fluid, the parameter of the fluid including a force exerted on the deformable member due to the fluid, the deformable member being a part of a transducer configured to measure the at least one parameter, a portion of the deformable member being surrounded by a housing to define an isolated region bounded by the portion and the housing, and to define an isolated surface of the deformable member, the housing configured to exclude the fluid from the isolated region and the isolated surface to cause the isolated region and the isolated surface to be isolated from the fluid and from the at least one parameter to be estimated, an exposed portion of the surface of the deformable member configured to be exposed to the fluid and the at least one parameter;

deforming the deformable member due to exposure to the parameter of the fluid;

transmitting a measurement signal into at least one optical fiber sensor, the at least one optical fiber sensor including an optical fiber disposed on the deformable member, the optical fiber having a first fiber portion and a second fiber portion, the first fiber portion disposed on the isolated surface and held in an operable relationship with the isolated surface, the second fiber portion disposed on the deformable member and oriented relative to a major axis of the deformable member such that the second fiber portion is insensitive to the deforming the deformable member due to exposure to the parameter of the fluid;

receiving a first return signal from the first fiber portion through the optical fiber sensor, the first return signal dependent on a deformation of the first fiber portion in response to the deforming;

estimating the parameter of the fluid based on the first return signal; and receiving a second return signal indicative of a temperature from the second fiber portion, and estimating the temperature based on the second return signal.

20. The method of claim 19, wherein the first fiber portion is wrapped around the isolated surface and defines at least one turn around the isolated surface, the at least one turn at least generally perpendicular to a major axis of the deformable member, and the second fiber portion is positioned at least substantially parallel to the major axis of the elongated member.

* * * * *